(12) United States Patent
Hayashi et al.

(10) Patent No.: US 8,969,123 B2
(45) Date of Patent: Mar. 3, 2015

(54) APPARATUS FOR MANUFACTURING DYE-SENSITIZED SOLAR CELL, AND METHOD OF MANUFACTURING DYE-SENSITIZED SOLAR CELL

(75) Inventors: Hiroaki Hayashi, Minato-ku (JP); Ryuichi Shiratsuchi, Kitakyushu (JP); Suehiro Ohkubo, Kitakyushu (JP); Shuzi Hayase, Kitakyushu (JP); Taiichi Mure, Kitakyushu (JP); Yasuhiro Shishida, Kitakyushu (JP)

(73) Assignees: Tokyo Electron Limited, Tokyo (JP); Kyushu Institute of Technolgy, Kitakyushu-shi (JP)

( * ) Notice: Subject to any disclaimer, the term of this patent is extended or adjusted under 35 U.S.C. 154(b) by 146 days.

(21) Appl. No.: 13/580,782

(22) PCT Filed: Feb. 24, 2011

(86) PCT No.: PCT/JP2011/001069
§ 371 (c)(1),
(2), (4) Date: Sep. 25, 2012

(87) PCT Pub. No.: WO2011/105089
PCT Pub. Date: Sep. 1, 2011

(65) Prior Publication Data
US 2013/0034930 A1    Feb. 7, 2013

(30) Foreign Application Priority Data
Feb. 25, 2010 (JP) .................... 2010-039846

(51) Int. Cl.
*H01L 31/18* (2006.01)
*H01L 51/48* (2006.01)
*H01G 9/20* (2006.01)

(52) U.S. Cl.
CPC .......... *H01G 9/2068* (2013.01); *H01G 9/2031* (2013.01); *H01G 9/2059* (2013.01); *Y02E 10/542* (2013.01)
USPC ............ 438/82; 438/57; 438/85; 118/75; 118/712; 257/E31.015; 257/E51.012

(58) Field of Classification Search
USPC ........................................... 118/427
See application file for complete search history.

(56) References Cited

U.S. PATENT DOCUMENTS 4,511,595 A * 4/1985 Inoue ............................ 427/581
4,917,123 A * 4/1990 McConnell et al. ......... 134/95.2

(Continued)

FOREIGN PATENT DOCUMENTS

JP    2001-185244    7/2001
JP    2002-075472    3/2002

(Continued)

OTHER PUBLICATIONS

International Search Report issued Apr. 12, 2011 in PCT/JP2011/001069 filed Feb. 24, 2011.

*Primary Examiner* — Angel Roman
(74) *Attorney, Agent, or Firm* — Oblon, McClelland, Maier & Neustadt, L.L.P.

(57) ABSTRACT

In an apparatus for manufacturing a dye-sensitized solar cell, a photosensitization dye solution makes contact with an electrode material layer that functions as a working electrode of a dye-sensitized solar cell so that the photosensitizing dye is adsorbed on the layer. Such an apparatus for manufacturing a dye-sensitized solar cell has a substrate housing section to house a substrate with the electrode material layer formed on its surface, and a circulation mechanism to circulate the photosensitization dye solution in such a way that the solution passes a surface of the substrate housed in the substrate housing section. In such an apparatus, a cross-sectional area of a flow path for the photosensitization dye solution in a portion facing the substrate in the substrate housing section is set smaller than a cross-sectional area of a flow path for the photosensitization dye solution in other portions.

20 Claims, 4 Drawing Sheets

(56) References Cited

U.S. PATENT DOCUMENTS

| | | | |
|---|---|---|---|
| 5,674,571 A * | 10/1997 | Focke et al. | 427/276 |
| 2001/0004901 A1 | 6/2001 | Yamanaka et al. | |
| 2002/0164414 A1* | 11/2002 | Okubo et al. | 427/8 |
| 2005/0166959 A1* | 8/2005 | Lee et al. | 136/263 |
| 2008/0236658 A1 | 10/2008 | Handa et al. | |
| 2011/0027938 A1* | 2/2011 | Ahn | 438/93 |

FOREIGN PATENT DOCUMENTS

| | | |
|---|---|---|
| JP | 2004-014370 | 1/2004 |
| JP | 2004-264750 A | 9/2004 |
| JP | 2008-071535 | 3/2008 |
| JP | 2008-243752 | 10/2008 |
| JP | 2009-67976 A | 4/2009 |
| JP | 2010-009830 | 1/2010 |
| TW | 200929581 A | 7/2009 |

* cited by examiner

APPARATUS FOR MANUFACTURING DYE-SENSITIZED SOLAR CELL, AND METHOD OF MANUFACTURING DYE-SENSITIZED SOLAR CELL

TECHNICAL FIELD

The present invention relates to an apparatus for manufacturing a dye-sensitized solar cell and a method for manufacturing a dye-sensitized solar cell.

BACKGROUND ART

Solar cells using monocrystal, polycrystal or amorphous silicon semiconductors are used these days in electronic devices such as electronic calculators and for residential units. However, since high precision procedures such as plasma CVD and crystal growth processes at high temperature are employed to manufacture solar cells using such silicon semiconductors, a significant amount of energy is required and expensive apparatuses that operate in a vacuum. Thus, the manufacturing cost is high.

Therefore, for solar cells to be manufactured at low cost under normal atmospheric pressure, dye-sensitized solar cells are suggested. In a general cell design, dye-sensitized solar cells have the following: transparent conductive thin film formed on a surface of a transparent substrate; a working electrode which is formed on the transparent conductive thin film and has a porous metal-oxide semiconductor layer made of fine particles with adsorbed dye; an opposing counter electrode made of a catalyst (such as a conductive substrate with platinum or carbon); and electrolyte between the working electrode and the counter electrode. As for the photosensitizing dye, a metal complex containing metal such as Ru, or an organic dye that does not contain metal, is used.

However, a process for dye to be adsorbed on the porous metal-oxide semiconductor layer is conducted by dipping the substrate in a solution with dissolved dye for about half a day in a dark place under atmospheric pressure. Thus, to reduce the time for manufacturing dye-sensitized solar cells and make the process more efficient, a high-speed dye adsorption procedure is required.

As a method for high-speed dye adsorption, the following is proposed, for example: a substrate having a film made of porous metal-oxide semiconductor fine particles is dipped in compressed fluid containing carbon dioxide under temperature and pressure conditions for obtaining supercritical carbon-dioxide fluid with a dissolved Ru complex, a metal complex, as a dye solution. It is reported that a dye-adsorbed film obtained by dipping a substrate for 30 minutes using the above method shows higher photoelectric conversion efficiency than a film obtained by a conventional dipping method (for example, see patent publication (1)).

PRIOR ART PUBLICATION

Patent Publication

Patent Publication (1): Japanese Laid-Open Patent Publication No. 2008-71535

SUMMARY OF THE INVENTION

Problem(s) to be Solved by the Invention

A dye made of an Ru complex shows high photoelectric conversion efficiency, but it takes a long time for the dye to be adsorbed. In the case a substrate is dipped in compressed fluid that includes supercritical carbon-dioxide fluid with a dissolved dye, the dye is adsorbed on a surface of a porous body made of oxide semiconductor fine particles in a very short period of time such as 30 minutes. However, making such compressed fluid requires a dye adsorption apparatus with a large-sized pressure vessel that can sustain pressure close to 100 atmospheric pressures. When such a pressure-resistant function is added to a production facility for large-scale cells, the apparatus will be very expensive, contrary to the demand for low-cost production of dye-sensitized solar cells.

Therefore, a method and apparatus that allows dye adsorption in a short period of time without using high pressure near 100 atmospheric pressures are in demand to achieve high-speed and low-cost processes for producing dye-sensitized solar cells as well as enhanced photoelectric conversion efficiency in dye-sensitized solar cells manufactured in a system that includes a dye adsorption process.

The present invention was carried out considering conventional problems described above. Its objective is to provide an apparatus and a method for manufacturing dye-sensitized solar cells to achieve high-speed and low-cost processes for producing dye-sensitized solar cells as well as enhanced photoelectric conversion efficiency in dye-sensitized solar cells manufactured in a system that includes the dye adsorption process.

Solution(s) to the Problem(s)

In an apparatus for manufacturing a dye-sensitized solar cell according to the present invention, a photosensitization dye solution makes contact with an electrode material layer that functions as a working electrode of a dye-sensitized solar cell so that the photosensitizing dye is adsorbed on the layer. Such an apparatus for manufacturing a dye-sensitized solar cell has the following: a substrate housing section to house a substrate with the electrode material layer formed on its surface; and a circulation mechanism to circulate the photosensitization dye solution in such a way that the solution passes over a surface of the substrate housed in the substrate housing section. In such an apparatus, a cross-sectional area of a flow path for the photosensitization dye solution in a portion facing the substrate in the substrate housing section is set smaller than a cross-sectional area of a flow path for the photosensitization dye solution in other portions.

In a method for manufacturing a dye-sensitized solar cell according to the present invention, a photosensitization dye solution makes contact with an electrode material layer that functions as a working electrode of a dye-sensitized solar cell so that the photosensitizing dye is adsorbed on the layer. Such a method for manufacturing a dye-sensitized solar cell includes the following: housing a substrate with the electrode material layer formed on its surface in a substrate housing section shaped like a sealing container; and circulating the photosensitization dye solution through an narrow path formed between the surface of the substrate housed in the substrate housing section and its opposing surface of the substrate housing section.

Effect(s) of the Invention

According to the present invention, an apparatus and a method for manufacturing dye-sensitized solar cells are provided to achieve high-speed and low-cost processes for producing dye-sensitized solar cells as well as enhanced photoelectric conversion efficiency in dye-sensitized solar cells manufactured in a system that includes the dye adsorption process.

MODE TO CARRY OUT THE INVENTION

Figure 1:
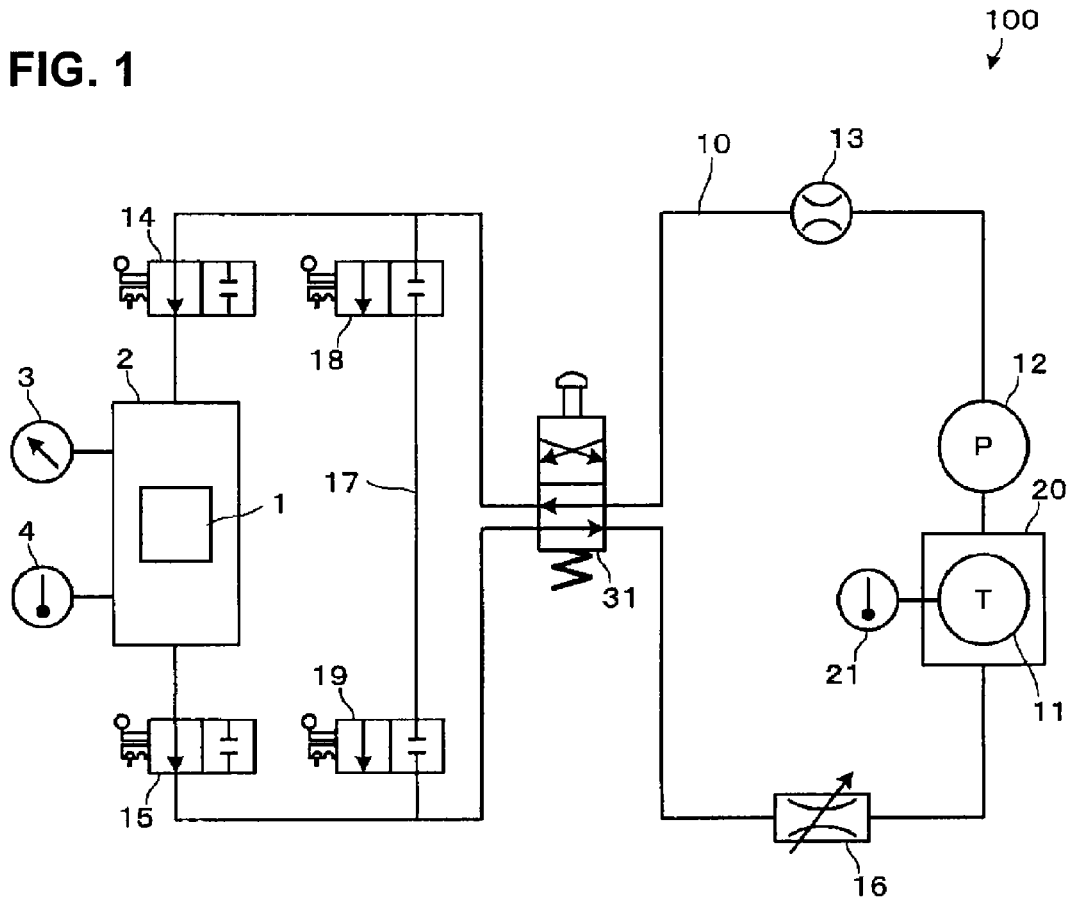
FIG. 1 a view showing the structure of a photosensitizing dye adsorption apparatus according to an embodiment of the present invention.

In the following, an embodiment of the present invention is described in detail by referring to the drawings. However, the description below is only an example, and various embodiments that satisfy the same physical and chemical conditions can be carried out within the scope of the present invention.

FIG. 1 is a view schematically showing the entire structure of photosensitizing dye adsorption apparatus 100 as an apparatus for manufacturing dye-sensitized solar cells according to an embodiment of the present invention. Photosensitizing dye adsorption apparatus 100 has substrate housing section 2 to dispose substrate 1 having an electrode material layer that functions as a working electrode of a dye-sensitized solar cell.

Substrate housing section 2 is shaped like a sealing container. In substrate housing section 2, pressure gauge 3 to measure the pressure of a photosensitization dye solution inside and thermometer 4 to measure the temperature of the photosensitization dye solution are provided so that the pressure and the temperature of the photosensitization dye solution are measured. A temperature adjustment bath, which is not shown in the drawing, is provided outside substrate housing section 2 to adjust the temperature of the photosensitization dye solution in substrate housing section 2. In addition, circulation line 10 to circulate the photosensitization dye solution is connected to substrate housing section 2.

Tank 11 for storage of a photosensitization dye solution is inserted in circulation line 10, along with pump 12, flow gauge 13, manual valves (14, 15), needle valve 16, and reversing valve 31. Also, in circulation line 10, bypass line 17 is provided, which is divided from the upstream side of substrate housing section 2 to join the downstream side of substrate housing section 2. Manual valves (18, 19) are inserted in bypass line 17. Bypass line 17 is for circulating a photosensitization dye solution while bypassing substrate housing section 2, and is used when substrate 1 having an electrode material layer is disposed in or removed from substrate housing section 2. By circulating a photosensitization dye solution through bypass line 17, the photosensitization dye solution is blocked from circulating through substrate housing section 2 without halting the flow of the photosensitization dye solution. Accordingly, it is easy to replace a treated substrate 1 with a subsequent untreated substrate 1, allowing speedy treatment on the subsequent substrate 1. Whether a photosensitization dye solution is circulated through substrate housing section 2, or whether the photosensitization dye solution is circulated through bypass line 17 while bypassing substrate housing section 2, is determined by switching manual valves (14, 15, 18, 19). Photosensitization dye solutions deteriorate if exposed to light. Thus, circulation line 10 and bypass line 17 are preferred to be formed using a non-light-permeable material, or covered with a non-light-permeable material.

Reversing valve 31 is to reverse the flow of a photosensitization dye solution to substrate 1. When the size of substrate 1 is large, the adsorbed amounts of a photosensitizing dye on the electrode material layer of substrate 1 may be different on the upstream side and the downstream side of the photosensitization dye solution. Also, when multiple substrates 1 are disposed in substrate housing section 2 to be treated, the adsorbed amount of a photosensitizing dye on substrate 1 disposed on the upstream side may be different from that on substrate 1 disposed on the downstream side. Therefore, the flow of the photosensitization dye solution is reversed by switching flow paths at reversing valve 31 so that the photosensitizing dye is uniformly adsorbed.

Tank 11 for storage of a photosensitization dye solution includes temperature adjustment bath 20 to adjust the temperature of a photosensitization dye solution inside, and thermometer 21 to measure the temperature of the photosensitization dye solution in tank 11. Then, the photosensitization dye solution whose temperature is adjusted by temperature adjustment bath 20 is circulated to substrate housing section 2 using pump 12. Here, if the temperature of the photosensitization dye solution changes before reaching substrate housing section 2 from tank 11, circulation line 10 may be formed using a material with high thermal insulation, or circulation line 10 and bypass line 17 may be covered with thermal insulation material.

As for photosensitization dye solutions, a solution is used in which a photosensitizing dye is dissolved in a solvent. As for photosensitizing dyes, there are metal complexes that contain metal such as Ru or organic dyes that do not contain metal. For Ru metal complexes, N3, N719, and black dyes are often used. For organic dyes, the following dyes are used: indoline, xanthene, coumarin, perylene, cyanine, merocyanine, polyene, porphyrin or the like. As for solvents to dissolve photosensitizing dyes, water or a commonly used organic solvent such as alcohol, acetonitrile, ethanol, toluene, dimethylformamide, tetrahydrofuran or the like is used.

The concentration of a photosensitization dye solution is preferred to be in an approximate range of 0.1 mM~1 mM. Low concentration causes an increase in adsorption time, and high concentration causes association of photosensitizing dye molecules on fine particles to which the photosensitizing dye is adsorbed. Such association lowers photoelectric conversion efficiency. In addition, the concentration of a photosensitization dye solution gradually decreases while the photosensitizing dye is being adsorbed on substrate 1 having an electrode material layer. Also, the concentration increases when the solvent has evaporated. Accordingly, it is important to monitor the concentration of a photosensitization dye solution. Therefore, a concentration measuring device for measuring the concentration of a photosensitization dye solution may be provided for circulation line 10 or tank 11 to monitor changes in the concentration of the photosensitization dye solution during the adsorption process.

Figure 2:
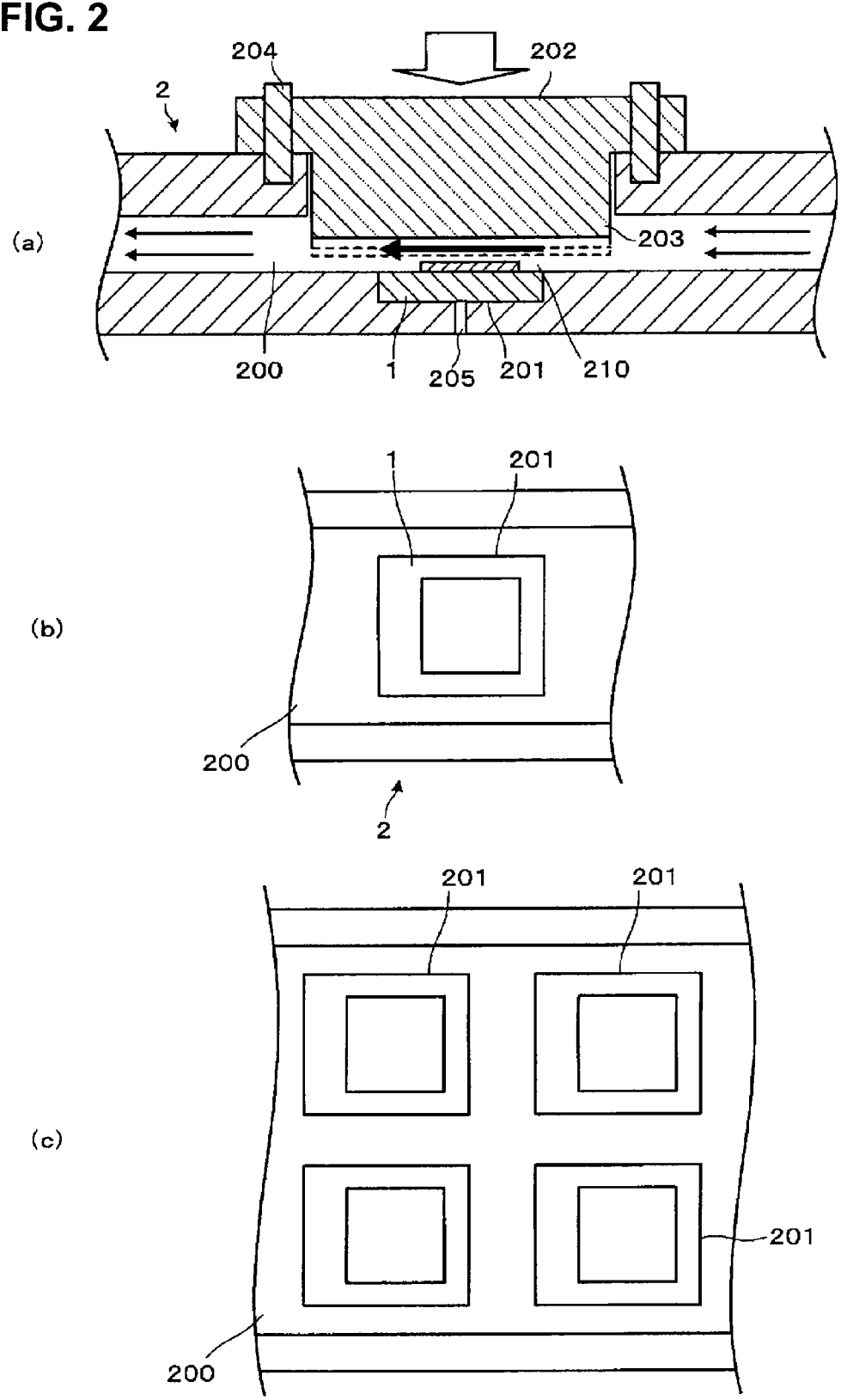
FIG. 2 views showing the structure of portions of the photosensitizing dye adsorption apparatus shown in FIG. 1.
Figure 3:
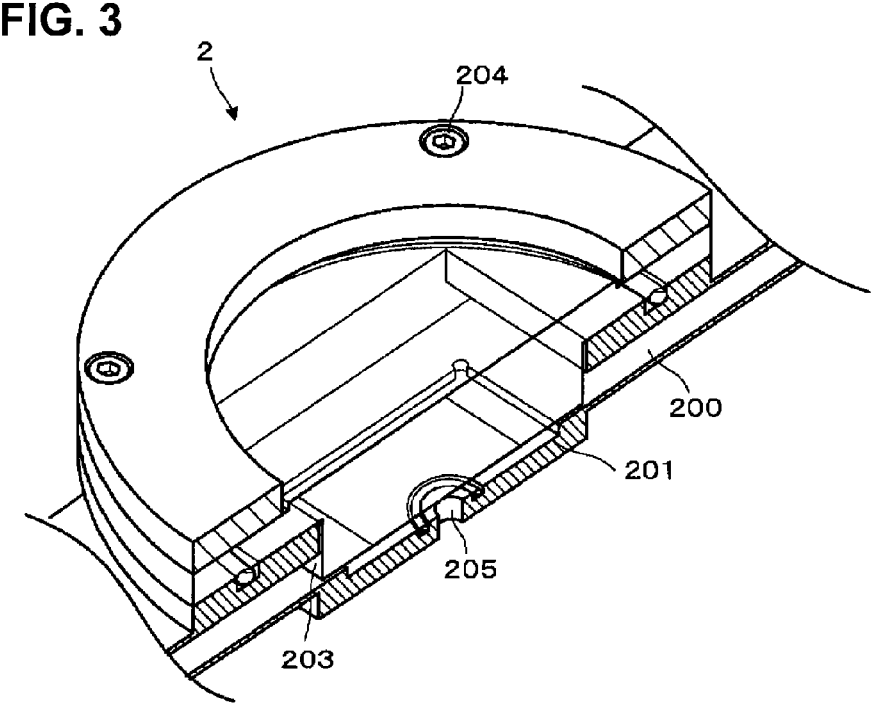
FIG. 3 a view showing the structure of a portion of the photosensitizing dye adsorption apparatus shown in FIG. 1.

FIG. 2 schematically shows a vertical cross-sectional structure (FIG. 2(a)) and a horizontal cross-sectional structure (FIG. 2(b)) of substrate housing section 2 described above. FIG. 3 is a perspective view schematically showing the structure of the upper surface of substrate housing section 2 by cutting it in half. As shown in FIG. 2, substrate housing section 2 has flow path 200 shaped to be rectangular in its cross section to flow the photosensitization dye solution. In substantially a central portion of flow path 200, recessed portion 201 is formed, being recessed in a rectangular shape corresponding to the outline of substrate 1 so that substrate 1 is disposed therein. In recessed portion 201, adsorption mechanism 205 is formed to secure substrate 1.

In addition, cover member 202 is formed in the ceiling portion of flow path 200 facing recessed portion 201. Beneath cover member 202, protruding portion 203 is formed, protruding in a rectangular shape corresponding to the shape of flow path 200. Flow path (narrow path) 210, a portion of a flow path for a photosensitization dye solution which is positioned between protruding portion 203 and substrate 1 and faces the surface of substrate 1, is set to be narrower than the other portions. In other words, the cross-sectional area of the flow path 210 is set smaller than the cross-sectional area of the flow path 200. Here, cover member 202 and protruding portion 203 are detachable by removing multiple (four in the present embodiment) screws 204. The cross-sectional area of flow path 210 can be changed by replacing cover member 202 with another cover member having protruding portion 203 of a different protruding amount.

Also, since photosensitization dye solutions deteriorate if exposed to light, cover member 202 and protruding portion 203 are preferred to be formed using a material that is not light permeable. However, they are formed with clear acrylic material in the present embodiment. In doing so, cover member 202 and protruding portion 203 are used as observation windows to observe the inside of substrate housing section 2. In such a case, cover member 202 is preferred to be covered by a shading member while observation is not required.

Figure 4:
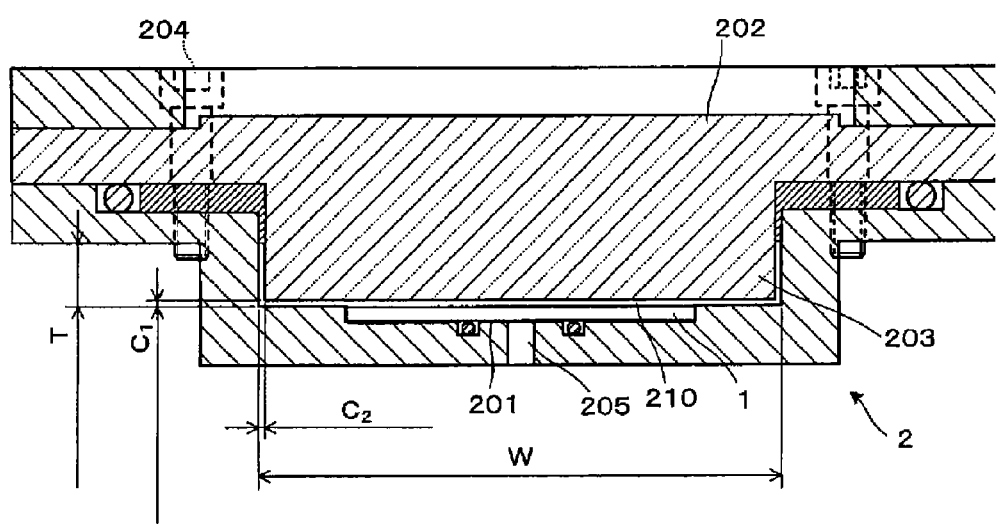
FIG. 4 a view showing the structure of a portion of the photosensitizing dye adsorption apparatus shown in FIG. 1.

FIG. 4 is a view showing an example of the cross-sectional structure of flow path 210 described above. In this example, flow-path width (W) is 90 mm, flow-path height (T) is 10 mm, distance ($C_1$) between the lower surface of protruding portion 203 and the upper surface of substrate 1 is approximately 1 mm, and distance ($C_2$) between a side surface of protruding portion 203 and a side wall of flow path 200 is approximately 1 mm. In this case, the flow area of flow path 210 is 108 mm$^2$.

In photosensitizing dye adsorption apparatus 100 with the above structure, substrate 1 having an electrode material layer that functions as a working electrode of a dye-sensitized solar cell is disposed in substrate housing section 2, and a photosensitization dye solution in tank 11 adjusted to have a predetermined temperature is circulated by driving pump 12 while manual valves (14, 15) are opened and manual valves (18, 19) are closed. In doing so, the photosensitizing dye is adsorbed on the electrode material layer of substrate 1. During that time, by reducing the flow area of flow path 210, a required amount of photosensitizing dye is adsorbed efficiently on the electrode material layer of substrate 1 in a short period of time. That is thought to be because of the following effects: an increase in the pressure of a photosensitization dye solution flowing through flow path 210 makes it easier for the photosensitization dye solution to penetrate through a porous metal-oxide semiconductor layer; and an increase in the flow speed of the photosensitization dye solution flowing through flow path 210 causes an increase in the amount of the photosensitizing dye per unit time to be in contact with fine particles of a porous metal-oxide semiconductor layer. After the photosensitizing dye is adsorbed on the electrode material layer formed on substrate 1 using adsorption apparatus 100, a counter electrode is laminated on substrate 1, and an electrolyte solution is injected and sealed. Accordingly, a dye-sensitized solar cell is obtained.

In the present embodiment, the flow area of flow path 210 is adjusted by using detachable cover member 202 which has protruding portion 203. However, a side wall of flow path 210 may be formed in advance to protrude inward so that the flow area of flow path 210 becomes smaller than the flow area of flow path 200. Alternatively, a detachable substrate placing member with a protruding portion may be used. Yet alternatively, the flow area of flow path 210 may be made smaller than the flow area of flow path 200 by arranging a vertically movable substrate placing table and by setting substrate 1 closer to a wall surface of flow path 210. Yet alternatively, the flow area of flow path 210 may be made smaller than the flow area of flow path 200 by arranging a movable member on a wall surface (a side wall, for example) of flow path 210 to narrow flow path 210.

Furthermore, substrate housing section 2 may be designed to house multiple substrates 1. As shown in FIG. 2(c), if multiple recessed portions 201 are formed to house multiple substrates 1, an even faster production process for dye-sensitized solar cells is achieved at lower cost.

Next, photosensitizing dye adsorption apparatus (100a) according to another embodiment is described with reference to FIG. 5. To produce dye-sensitized solar cells with high photoelectric conversion efficiency, a rinsing treatment is required after the adsorption process of a photosensitizing dye so that extra photosensitizing dye which does not contribute to photoelectric conversion is rinsed off. In addition to tank 11 for storage of a photosensitization dye solution, rinse tank 22 for storage of a rinse solution is provided in temperature adjustment bath 20 in the present embodiment. As for a rinse solution, water or a commonly used organic solvent such as alcohol, acetonitrile, toluene, dimethylformamide, tetrahydrofuran or the like is used. However, it is preferred to use the same solution as the solvent to dissolve a photosensitizing dye. Also, thermometer 23 is provided in rinse tank 22 to measure the temperature of the rinse solution.

Moreover, switching valves (24, 25) are provided respectively on the exit side and entrance side of tank 11 and rinse tank 22 of circulation line 10 so that a solution that circulates through circulation line 10 is switched between a photosensitization dye solution and a rinse solution. Accordingly, a photosensitization dye solution is first circulated so that the photosensitizing dye is adsorbed on substrate 1, then a rinsing process is conducted by circulating a rinse solution. Since the rest of the structure is the same as photosensitizing dye adsorption apparatus 100 shown in FIG. 1, the same reference number is applied to the corresponding portion, and its redundant description is omitted here.

Using the photosensitizing dye adsorption apparatus described above, the adsorption process of a photosensitizing dye is first conducted for manufacturing working electrodes of dye-sensitized solar cells, followed by a rinsing process required to produce dye-sensitized solar cells with high photoelectric conversion efficiency. Namely, the apparatus can be used for a rinsing process in an apparatus for manufacturing dye-sensitized solar cells. After the photosensitizing dye adsorption process is conducted, a rinsing process can be conducted without taking out substrate 1 from the apparatus. Thus, an even faster production process is achieved for producing dye-sensitized solar cells with high photoelectric conversion efficiency.

EXAMPLE(S)

An example is described in the following. A glass substrate with a thin film of fluoro-doped tin oxide (FTO) with a size of 60 mm×70 mm×3 mm (9~10Ω/□, made by Nippon Sheet Glass Co., Ltd.) was used. Next, a porous titanium-oxide thin film was formed on the FTO film of the substrate with FTO film. For the titanium oxide, commercially available titanium paste Ti-Nanoxide D/SP (Solaronix) was used. Using a screen printing method, the paste is applied on the FTO film of the substrate with FTO film in a range of 50 mm×50 mm (for later-described evaluation of the amount of dye adsorption), or in a range of 5 mm×5 mm (for later-described evaluation of characteristics), and then calcined in an electric furnace at 500 degrees to obtain a thickness of 8 µm±0.5 µm.

set at 5 mm (flow-path area 460 mm$^2$). For each distance, the flow rate of a photosensitization dye solution was set at 27000 mm$^3$/s, 54000 mm$^3$/s, 86400 mm$^3$/s or 108000 mm$^3$/s. The immersion time was set at 15 minutes, 30 minutes or 45 minutes. The temperature of the photosensitization dye solution was set at 30° C. The results are shown in Table 1.

TABLE 1

| condition | gap above substrate (mm) | width of flow path (mm) | area of flow path (mm$^2$) | flow speed over substrate (mm/s) | flow rate (mm$^3$/s) | pressure (kPa): actual value | temp. | concentration (mM) | adsorption amount [(nmol/cm$^2$)/µm] to immersion time (min.) | | |
|---|---|---|---|---|---|---|---|---|---|---|---|
| | | | | | | | | | 15 min. | 30 min. | 45 min. |
| 1-① | 1 | 90 | 108 | 250 | 27000 | 2.3~3.2 | 30° C. | 0.3 | 7.09 | 9.81 | 11.26 |
| 1-② | 1 | 90 | 108 | 500 | 54000 | 6.5~7.0 | 30° C. | 0.3 | 7.02 | 10.35 | 11.47 |
| 1-③ | 1 | 90 | 108 | 800 | 86400 | 14.0~16.0 | 30° C. | 0.3 | — | 11.71 | — |
| 1-④ | 1 | 90 | 108 | 1000 | 108000 | 19.6~25.5 | 30° C. | 0.3 | 9.41 | 12.91 | 13.51 |
| 5-① | 5 | 90 | 460 | 59 | 27000 | 0.9~1.8 | 30° C. | 0.3 | 4.64 | 7.78 | 9.76 |
| 5-② | 5 | 90 | 460 | 117 | 54000 | 5.3~7.3 | 30° C. | 0.3 | 4.8 | 8.47 | 10.11 |
| 5-③ | 5 | 90 | 460 | 188 | 86400 | 11.9~13.0 | 30° C. | 0.3 | 5.55 | 8.87 | 12.15 |
| 5-④ | 5 | 90 | 460 | 235 | 108000 | 18.5~20.1 | 30° C. | 0.3 | 6.1 | 9.12 | 11.57 |

For a solution used to adsorb dye on porous titanium-oxide thin film to make a working electrode, a dye (organic complex of ruthenium (Ru) N719 cis-bis (isothiocyanato) bis (2,2'-bipyridyl-4,4'-dicarboxylato)-ruthenium (II) bis-tetrabutylammonium), made by Dyesol Ltd.) was prepared to be 0.3 mM by using ethanol. Photosensitizing dye adsorption apparatus 100 described above was used for dye adsorption, and then the substrate was taken out from adsorption apparatus 100. Then, to remove excess dye attached to the entire substrate including the working electrode, the substrate was rinsed by being dipped in stationary ethanol for 15 minutes and was dried. Then, the porous titanium-oxide thin film with attached dye was put into a beaker containing 100 ml of 0.1 M sodium-hydrate solution so that the dye was completely dissolved in the solution. Then, 3 ml of the solution was put into a silica glass cell and its absorbancy was measured by using a spectral photometer to evaluate the adsorbed amount of dye.

An electrolyte solution was prepared with 0.05 M of $I_2$ (iodine), 0.5 M of LiI (lithium iodide), 0.58 M of tBP (tertiary butylpyridine) and 0.6 M of DMPII (ionic liquid), and the concentration was adjusted by using MeCN (acetonitrile) as a solvent.

A Pt catalyst for the counter electrode was prepared by sputtering to be approximately 10 nm thick on the ITO film of the glass substrate with ITO film. To laminate the working electrode and the counter electrode, a thermoplastic sheet-type adhesive agent made of ionomer resin was used and thermally pressed at 100 degrees so that those electrodes were paired. Then, the above electrolyte solution was injected into the paired cells and sealed. Accordingly, a photoelectric conversion element was obtained.

The photoelectric conversion element was used as a dye-sensitized solar cell, and the cell characteristics were evaluated using pseudo sunlight of AM 1.5. Conditions for producing photoelectric conversion elements and the results of actual values I-V (efficiency, Voc, Jsc and FF) are shown in later-described tables.

First, photosensitizing dye adsorption apparatus 100 described above was used to measure the relationship between distance ($C_1$) from the lower surface of protruding portion 203 to the upper surface of substrate 1 and the adsorbed amount of dye. The results are described below. Measurements were conducted when distance ($C_1$) was set at 1 mm (flow-path area 108 mm$^2$) and when distance ($C_1$) was Here, the approximate adsorbed amount of photosensitizing dye is preferred to be at least 8.0 (nmol/cm$^2$)/µm or greater for a dye-sensitized solar cell. Formerly, at least 5~6 hours were required to obtain such an adsorbed amount when adsorption was conducted under conditions of atmospheric pressure, room temperature and stationary solution.

By contrast, as shown in table 1 above, when distances ($C_1$) were set at 1 mm and 5 mm, the above adsorbed amount was obtained in about 30 minutes for each distance. In addition, when distance ($C_1$) was set at 1 mm, it was confirmed that a high adsorbed amount was obtained in a short period of time, compared with when distance ($C_1$) was set at 5 mm with the same flow rate. For example, the flow rate was 108000 mm$^3$/s and distance ($C_1$) was 1 mm, the adsorbed amount was 9.41 (nmol/cm$^2$)/µm in 15 minutes, which is greater than the adsorbed amount of 9.12 (nmol/cm$^2$)/µm in 30 minutes when the flow rate was the same but distance ($C_1$) was 5 mm. Namely, by making distance ($C_1$) smaller, a required adsorbed amount is obtained in a shorter period of time. Under such conditions, each distance ($C_1$) is preferred to be 5 mm or less, more preferably 1 mm or less. As described above, by reducing the cross-sectional area of the flow path for a photosensitization dye solution in a portion facing the surface of substrate 1 (by making distance ($C_1$) smaller), the photosensitizing dye is adsorbed efficiently in a short period of time.

Figure 5:
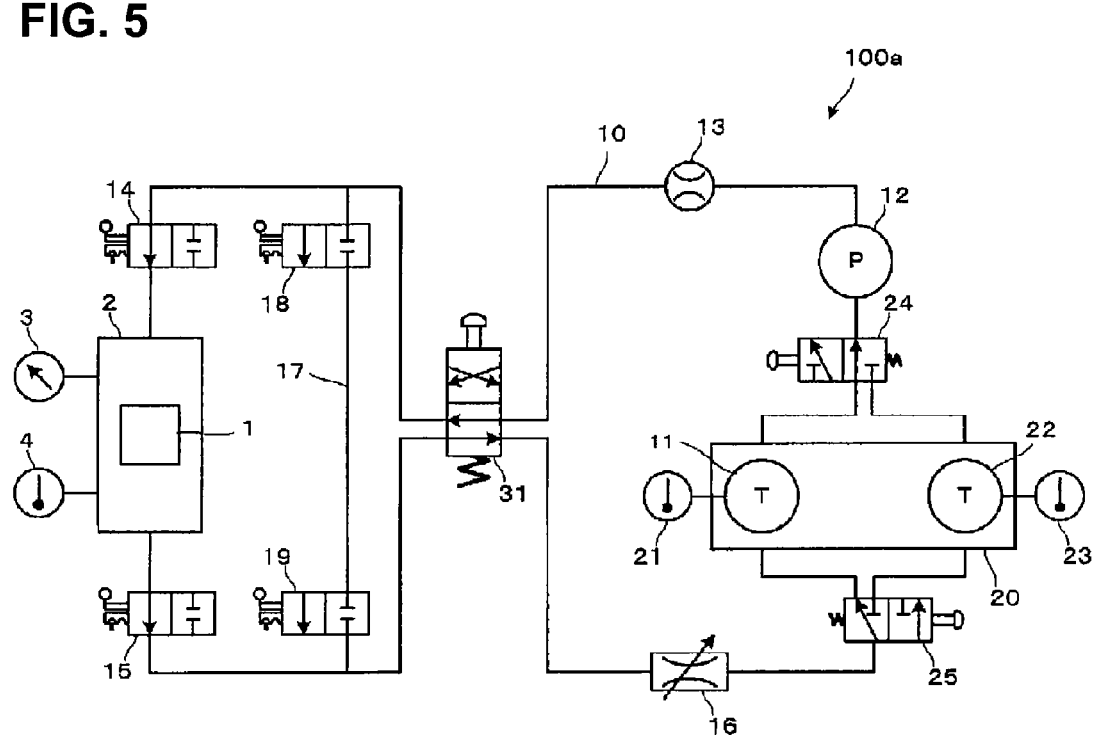
FIG. 5 a view showing the structure of a photosensitizing dye adsorption apparatus according to another embodiment of the present invention.

Next, adsorption apparatus (100a) for a photosensitization dye solution shown in FIG. 5 was used, and a rinsing process using a rinse solution was conducted following the adsorption process of the photosensitizing dye described above. The result of progress in such a rinsing process is described below. Porous titanium-oxide thin film in a 5 mm×5 mm section was formed as described above, and a process of adsorbing photosensitizing dye was conducted using adsorption apparatus 100. Such a dye adsorption process was conducted under the following conditions: distance ($C_1$) at 1 mm, flow rate of the photosensitization dye solution at 108000 mm$^3$/s, immersion time of 60 minutes and temperature of the photosensitization dye solution at 30° C. After the dye was adsorbed, the substrate was taken out from adsorption apparatus 100 and rinsed by immersing it for one minute or 15 minutes in stationary ethanol. The characteristics of such cells were measured, and the results shown in Table 2 were obtained with photoelectric conversion efficiencies of 5.3% and 5.7% respectively. In addition, using adsorption apparatus (100a), a dye adsorption process was conducted under the same conditions, and then a rinsing process was conducted for one minute by setting distance ($C_1$) at 1 mm and the flow rate of a rinse solution at 27000 mm$^3$/s. The characteristics of the substrate were measured and the results shown in Table 2 were obtained with a photoelectric conversion efficiency of 5.7%. Namely, photosensitizing dye adsorption apparatus (100a) shown in FIG. 5 was used, and after the photosensitizing dye was adsorbed, a rinsing process was conducted for one minute by circulating a rinse solution in the same way as in the photosensitizing dye adsorption process. Under such conditions, the same characteristics were obtained as when a substrate was immersed and rinsed in stationary ethanol for 15 minutes, and higher characteristics were obtained than when a substrate was immersed and rinsed in stationary ethanol for one minute. Namely, a rinsing process of a photosensitizing dye was conducted efficiently in a short period of time.

TABLE 2

| Rinse Condition | Jsc [mA/cm$^2$] | Voc [mV] | F.F | Efficiency (%) |
| --- | --- | --- | --- | --- |
| EtOH immersion (15 min.) | 12.4 | 660 | 0.696 | 5.7 |
| EtOH immersion (1 min.) | 11.2 | 670 | 0.706 | 5.3 |
| 1-① (1 min.) | 11.8 | 685 | 0.705 | 5.7 |

As described above, according to the embodiments of the present invention, an apparatus and a method for manufacturing dye-sensitized solar cells are provided to achieve high-speed and low-cost procedures for producing dye-sensitized solar cells along with enhanced photoelectric conversion efficiency in dye-sensitized solar cells manufactured by a system that includes a dye adsorption process. However, the present invention is not limited to the above embodiments and examples, and needless to say, various modifications are included.

POTENTIAL INDUSTRIAL APPLICATIONS

The apparatus and method for manufacturing dye-sensitized solar cells according to the present invention can be used in manufacturing fields or the like of dye-sensitized solar cells, allowing potential industrial applications.

DESCRIPTION OF NUMERICAL REFERENCES

1 . . . substrate, 2 . . . substrate housing section, 3 . . . pressure gauge, 4 . . . thermometer, 10 . . . circulation line, 11 . . . tank, 12 . . . pump, 13 . . . flow gauge, 14, 15 . . . manual valve, 16 . . . needle valve, 17 . . . bypass line, 18, 19 . . . manual valve, 20 . . . temperature adjustment bath, 21 . . . thermometer, 31 . . . reversing valve

The invention claimed is:

1. An apparatus for manufacturing a dye-sensitized solar cell, comprising:
a substrate housing section forming a sealing container configured to house a substrate having an electrode material layer formed on a surface of the substrate; and
a circulation mechanism configured to circulate a photosensitization dye solution such that the photosensitization dye solution passes over the surface of the substrate housed in the substrate housing section and makes contact with the electrode material layer and that a photosensitizing dye is adsorbed on the electrode material layer,
wherein the substrate housing section has a flow path having a cross-sectional area perpendicular to a flow direction of the photosensitization dye solution in the substrate housing section such that the flow path includes a narrow path portion having the cross-sectional area which is extending over the substrate and set smaller than the cross-sectional area of other portions of the flow path.

2. The apparatus for manufacturing a dye-sensitized solar cell according to claim 1, wherein the narrow path portion of the flow path in the substrate housing section has a detachable protruding portion protruding into the flow path and configured to change the cross-sectional area of the flow path in the narrow path portion in the substrate housing section.

3. The apparatus for manufacturing a dye-sensitized solar cell according to claim 1, wherein the substrate housing section is configured to house a plurality of substrates including the substrate.

4. The apparatus for manufacturing a dye-sensitized solar cell according to claim 1, further comprising a reversing mechanism configured to reverse the flow direction of the photosensitization dye solution.

5. The apparatus for manufacturing a dye-sensitized solar cell according to claim 1, further comprising a temperature control mechanism configured to control a temperature of the photosensitization dye solution.

6. The apparatus for manufacturing a dye-sensitized solar cell according to claim 1, further comprising a flow-rate control mechanism configured to control a flow rate of the photosensitization dye solution.

7. The apparatus for manufacturing a dye-sensitized solar cell according to claim 1, further comprising a concentration measurement mechanism configured to detect a concentration of the photosensitization dye solution.

8. The apparatus for manufacturing a dye-sensitized solar cell according to claim 1, further comprising a rinse solution tank configured to store a rinse solution to rinse the photosensitizing dye, wherein the circulation mechanism is configured to circulate the rinse solution in the substrate housing section when switched with the photosensitization dye solution.

9. The apparatus for manufacturing a dye-sensitized solar cell according to claim 8, further comprising a temperature control mechanism configured to control a temperature of the rinse solution.

10. The apparatus for manufacturing a dye-sensitized solar cell according to claim 8, further comprising a flow-rate control mechanism configured to control a flow rate of the rinse solution.

11. A method for manufacturing a dye-sensitized solar cell, comprising:
housing a substrate having an electrode material layer formed on a surface of the substrate in a substrate housing section forming a sealing container; and
circulating a photosensitization dye solution through a flow path having an narrow path portion formed between the surface of the substrate housed in the substrate housing section and an opposing surface of the substrate housing section such that the photosensitization dye solution passes over the surface of the substrate housed in the substrate housing section and makes contact with the electrode material layer and that a photosensitizing dye is adsorbed on the electrode material layer,
wherein the flow path of the substrate housing section has a cross-sectional area perpendicular to a flow direction of the photosensitization dye solution in the substrate housing section such that the narrow path portion has the cross-sectional area which is extending over the substrate and set smaller than the cross-sectional area of other portions of the flow path.

12. The method for manufacturing a dye-sensitized solar cell according to claim 11, wherein the narrow path portion is formed such that a distance between the surface of the substrate and an opposing surface of the substrate housing section is set at 5 mm or less.

13. The method for manufacturing a dye-sensitized solar cell according to claim 11, wherein the substrate housing section has an overflow path formed such that a distance between the surface of the substrate and an opposing surface of the substrate housing section is set at 1 mm or less.

14. The method for manufacturing a dye-sensitized solar cell according to claim 11, wherein the electrode material layer is a porous metal-oxide semiconductor layer.

15. The method for manufacturing a dye-sensitized solar cell according to claim 11, wherein the photosensitizing dye in the photosensitization dye solution is an Ru metal-oxide photosensitizing dye or an organic photosensitizing dye.

16. The method for manufacturing a dye-sensitized solar cell according to claim 11, wherein the photosensitizing dye in the photosensitization dye solution has a concentration set in a range of 0.1 mM to 1 mM.

17. The method for manufacturing a dye-sensitized solar cell according to claim 11, wherein the housing of the substrate in the substrate housing section includes housing a plurality of substrates in the substrate housing section.

18. The method for manufacturing a dye-sensitized solar cell according to claim 11, further comprising reversing a flow of the photosensitization dye solution.

19. The method for manufacturing a dye-sensitized solar cell according to claim 11, further comprising conducting a rinsing process without taking out the substrate from the substrate housing section after the photosensitizing dye is adsorbed.

20. The apparatus for manufacturing a dye-sensitized solar cell according to claim 1, wherein the substrate housing section is formed such that the cross-sectional area of the narrow path portion has a constant cross-sectional area over the surface of the substrate.

* * * * *